US009816633B2

United States Patent
Kendrick

(10) Patent No.: US 9,816,633 B2
(45) Date of Patent: Nov. 14, 2017

(54) DEPRESSURIZATION SYSTEM FOR AN ELECTRICAL TRANSFORMER

(71) Applicant: SENTRY DEPRESSURIZATION SYSTEMS, INC., Monsey, NY (US)

(72) Inventor: William R. Kendrick, Houston, TX (US)

(73) Assignee: Sentry Depressurization Systems, Inc., Monsey, NY (US)

(*) Notice: Subject to any disclaimer, the term of this patent is extended or adjusted under 35 U.S.C. 154(b) by 0 days.

(21) Appl. No.: 14/351,451

(22) PCT Filed: Oct. 11, 2012

(86) PCT No.: PCT/US2012/059789
§ 371 (c)(1),
(2) Date: Apr. 11, 2014

(87) PCT Pub. No.: WO2013/055942
PCT Pub. Date: Apr. 18, 2013

(65) Prior Publication Data
US 2014/0266529 A1    Sep. 18, 2014

Related U.S. Application Data

(60) Provisional application No. 61/545,756, filed on Oct. 11, 2011.

(51) Int. Cl.
F16K 17/14   (2006.01)
F16K 17/40   (2006.01)
(Continued)

(52) U.S. Cl.
CPC .......... *F16K 17/406* (2013.01); *H01F 27/00* (2013.01); *H01F 27/14* (2013.01); *Y10T 137/1677* (2015.04)

(58) Field of Classification Search
CPC ........ F16K 17/406; H01F 27/00; H01F 27/14; Y10T 137/1677
(Continued)

(56) References Cited

U.S. PATENT DOCUMENTS 3,132,666 A    5/1964   Nelson
3,762,595 A   10/1973   Green et al.
(Continued)

FOREIGN PATENT DOCUMENTS

CN    1346499 A      4/2002
CN  101223612 A      7/2008
(Continued)

OTHER PUBLICATIONS

Partial Supplementary European Search Report dated Apr. 10, 2015 for for EP Patent Application No. 12840167.6 filed Oct. 11, 2012.
(Continued)

*Primary Examiner* — Minh Le
(74) *Attorney, Agent, or Firm* — Conley Rose, P.C.

(57) ABSTRACT

A depressurization system for an electrical transformer includes a pressure release assembly configured to be in fluid communication with a chamber of the electrical transformer. The pressure release assembly includes a rupture pin valve. The system may include an evacuation assembly having a blast chamber. The rupture pin valve includes a pin configured to buckle in response to a predetermined pressure applied to a surface of the rupture pin valve.

19 Claims, 12 Drawing Sheets

(51) Int. Cl.
*H01F 27/14* (2006.01)
*H01F 27/00* (2006.01)

(58) Field of Classification Search
USPC ...... 137/70, 68.17, 207, 514, 514.3; 361/35, 361/37, 38, 274.2, 280, 603
See application file for complete search history.

(56) References Cited

U.S. PATENT DOCUMENTS

| | | | | |
|---|---|---|---|---|
| 3,945,606 | A * | 3/1976 | McDonald | F16K 3/30 137/242 |
| 4,235,347 | A * | 11/1980 | Cothier | G01R 1/04 137/68.11 |
| 4,377,274 | A * | 3/1983 | Mayhew, Jr. | F16K 3/0281 251/266 |
| 4,724,857 | A * | 2/1988 | Taylor | F16K 17/406 137/538 |
| 5,014,730 | A * | 5/1991 | Fye | F16K 3/0227 137/454.2 |
| 5,067,511 | A * | 11/1991 | Taylor | F16K 17/164 137/461 |
| 5,116,089 | A * | 5/1992 | Taylor | E05B 65/102 292/229 |
| 5,146,942 | A * | 9/1992 | Taylor | F16K 17/164 137/461 |
| 5,273,065 | A * | 12/1993 | Taylor | F16K 17/14 137/494 |
| 5,295,661 | A * | 3/1994 | Roussel | F16K 3/0218 251/204 |
| 5,727,586 | A * | 3/1998 | Taylor | F16K 17/406 137/68.11 |
| 5,946,171 | A * | 8/1999 | Magnier | H01F 27/14 361/115 |
| 6,155,284 | A | 12/2000 | Scantlin | |
| 6,425,410 | B1 * | 7/2002 | Taylor | F16K 17/406 137/467 |
| 6,804,092 | B1 | 10/2004 | Magnier | |
| 7,317,598 | B2 | 1/2008 | Magnier | |
| 7,438,087 | B1 * | 10/2008 | Taylor | F16K 15/03 137/624.27 |
| 7,777,994 | B2 * | 8/2010 | Magnier | H01F 27/402 361/37 |
| 7,815,170 | B2 * | 10/2010 | Devine, Jr. | F16K 3/0227 251/326 |
| 8,319,590 | B2 * | 11/2012 | Magnier | H01H 9/0005 336/90 |
| 8,695,637 | B2 * | 4/2014 | McBride | F16K 39/04 137/629 |
| 2003/0173335 | A1 | 9/2003 | Dufournet | |
| 2005/0045847 | A1 * | 3/2005 | Powell | F16K 3/316 251/319 |
| 2006/0131534 | A1 * | 6/2006 | Leroux | F16K 3/0281 251/326 |
| 2006/0196539 | A1 * | 9/2006 | Raska | F16K 17/16 137/68.24 |
| 2007/0001793 | A1 | 1/2007 | Magnier | |
| 2007/0056629 | A1 * | 3/2007 | Klein | F16K 15/06 137/68.11 |
| 2008/0035466 | A1 * | 2/2008 | Barnett | B01D 3/16 203/4 |
| 2008/0186641 | A1 | 8/2008 | Wakchaure | |
| 2008/0269468 | A1 * | 10/2008 | Vogel | B01D 61/145 530/414 |
| 2009/0000406 | A1 | 1/2009 | Brazier et al. | |
| 2009/0231075 | A1 | 9/2009 | Moia | |
| 2011/0058289 | A1 | 3/2011 | Magnier | |
| 2012/0200961 | A1 * | 8/2012 | Magnier | H01F 27/402 361/37 |

FOREIGN PATENT DOCUMENTS

| | | |
|---|---|---|
| CN | 101263327 A | 9/2008 |
| CN | 101572167 A | 11/2009 |
| FR | 2791463 A1 | 9/2000 |
| FR | 2888034 A1 | 1/2007 |
| JP | 10261523 A | 9/1998 |

OTHER PUBLICATIONS

International Search Report Report and Written Opinion dated Mar. 8, 2013, for International Application No. PCT/US2012/059789.
Canadian Office Action dated Jul. 13, 2015, for Canadian Patent Application No. 2,852,052.
Chinese Office Action and English translation dated Sep. 15, 2015, for Chinese Patent Application No. 201280053098.6.
Mexican Office Action Summary dated Nov. 6, 2015, for Mexican Patent Application No. MX/a/2014/004363.
Extended European Search Report dated Jan. 8, 2016 for European Application No. 12840167.6.

* cited by examiner

DEPRESSURIZATION SYSTEM FOR AN ELECTRICAL TRANSFORMER

CROSS-REFERENCE TO RELATED APPLICATION

This application is a 35 U.S.C. §371 national stage application of PCT/US2012/059789 filed Oct. 11, 2012 and entitled "Depressurization System for an Electrical Transformer," which claims the benefit of U.S. provisional patent application Ser. No. 61/545,756 filed Oct. 11, 2011 and entitled "Depressurization System for a Transformer."

STATEMENT REGARDING FEDERALLY SPONSORED RESEARCH OR DEVELOPMENT

Not applicable.

BACKGROUND

Electrical transformers are commonly found as components within a power grid used for either "stepping up" or "stepping down" voltage of an alternating current to allow for more efficient transportation of electrical power within the power grid. Transformers alter the voltage of the alternating current flowing through it by inductively coupling two conductors housed within the transformer. Specifically, both of the conductors include coils that are individually wound about a core (e.g., a silicon steel core having high magnetic flux permeability), where each coil includes a specific number of turns or windings and the change in voltage of the current flowing through the two inductively coupled conductors is proportional to the ratio of turns of the coil for each conductor.

Due to the high amount of current flowing through the two conductors of the transformer, each conductor's coil is housed within a sealed chamber containing a coolant to prevent damaging critical components of the transformer, such as the insulation covering the individual windings for each conductor. For instance, transformers often include oil, such as mineral oil, within the sealed chamber to provide cooling to the inductively coupled conductors. In this arrangement, oil may be circulated from the chamber and through a heat exchanger to cool the oil so it may be recirculated back into the sealed chamber to further cool the conductors. Because the oil used in cooling the conductors is often flammable, an ignition source (i.e., a spark) within the sealed chamber may ignite the oil, causing it to rapidly heat and expand as it vaporizes, rapidly increasing fluid pressure within the chamber. For this reason, some transformers include a pressure relief valve (PRV) coupled to the chamber and configured to open in the event of an overpressurization of the chamber so as to reduce fluid pressure within the sealed chamber by releasing fluid from the chamber and to, for example, the surrounding environment. For instance, PRVs often include a spring having a stiffness corresponding to the amount of absolute pressure at which the PRV is meant to actuate. However, a period of time exists between the overpressurization event (i.e., spark and subsequent ignition) and the complete actuation of the PRV, which is sometimes referred to as the "response time" of the PRV. Other transformer systems include a depressurization fluid circuit coupled to the transformer that contains a burst disc that is configured to burst or rupture when exposed to a predetermined differential pressure across the upstream and downstream faces of the disc. Traditional electrical transformer systems using PRVs and/or burst discs may have a response time of up to one second. Thus, the response time of the PRV/burst disc may allow fluid pressure within the sealed chamber to rapidly increase to a level that jeopardizes the physical integrity of the chamber, which may lead to an explosion of the sealed chamber. Further, in the case of transformer systems using burst discs, the depressurization system that includes the burst disc must be disassembled in order to install a new, un-ruptured burst disc before the transformer system may be operated again. The process of disassembling and reassembling such a system in order to replace the destroyed burst disc may be costly and time consuming.

Thus, there is a need for a depressurization system for relieving fluid pressure within a fluid filled sealed chamber of an electrical transformer. Such a mechanism would be particularly well received if it had a relatively swift response time that decreased the risk of an explosion in the event of an overpressurization of the sealed chamber.

SUMMARY

An embodiment of a depressurization system for an electrical transformer includes a pressure release assembly configured to be in fluid communication with a chamber of an electrical transformer, wherein the pressure release assembly includes a rupture pin valve. In some embodiments, the depressurization system also includes an evacuation assembly coupled to the pressure release assembly and in selective fluid communication with the chamber. The evacuation assembly may include a blast chamber. In some embodiments, the blast chamber is configured to reduce a flow restriction within the depressurization system. The blast chamber may be disposed horizontally and coupled in close proximity to the rupture pin valve via an extension conduit. In some embodiments, the rupture pin valve includes a pin configured to buckle in response to a predetermined pressure applied to a surface of the rupture pin valve. The depressurization system may also include a proximity sensor coupled to the rupture pin valve, wherein the proximity sensor is configured to transmit a signal in response to buckling of the pin.

An embodiment of a depressurization system for an electrical transformer includes a pressure release mechanism to provide selective fluid communication with a sealed chamber of an electrical transformer and an evacuation assembly coupled to the pressure release mechanism, wherein the evacuation assembly includes a blast chamber that is disposed in close proximity to the pressure release mechanism and wherein the blast chamber is configured to reduce a flow restriction within the depressurization system. The pressure release mechanism may include a pressure release valve. In some embodiments, the blast chamber is configured to provide for radial expansion of received fluids. The evacuation assembly may include an evacuation pipe. In some embodiments, the evacuation pipe is configured to increase the distance between the electrical transformer and fluid ejected to the atmosphere at an open end of the pipe. In some embodiments, a check valve is coupled to the evacuation pipe of the depressurization system. The blast chamber may extend horizontally from the pressure release mechanism.

A method of depressurizing a chamber of an electrical transformer includes pressurizing a surface of a rupture pin valve with fluid from a chamber of an electrical transformer and actuating the rupture pin valve in response to the pressurization of the surface of the rupture pin valve. Actuating the rupture pin valve may include buckling a pin of the rupture pin valve in response to the pressurization of the surface of the rupture pin valve. The buckling of the pin may occur at a predetermined pressure. In some embodiments, the method may include replacing the buckled pin of the rupture pin valve with an unbuckled pin. In some embodiments, the method may include transmitting a signal from a proximity sensor coupled to the rupture pin valve in response to the actuating the rupture pin valve. In some embodiments, the method may include directing a fluid from the transformer chamber to a blast chamber via the actuated rupture pin valve, wherein the blast chamber is in close proximity to the rupture pin valve, and expanding the fluid in the blast chamber.

BRIEF DESCRIPTION OF THE DRAWINGS

For a detailed description of exemplary embodiments, reference will now be made to the accompanying drawings in which.

DETAILED DESCRIPTION

Figure 1A:
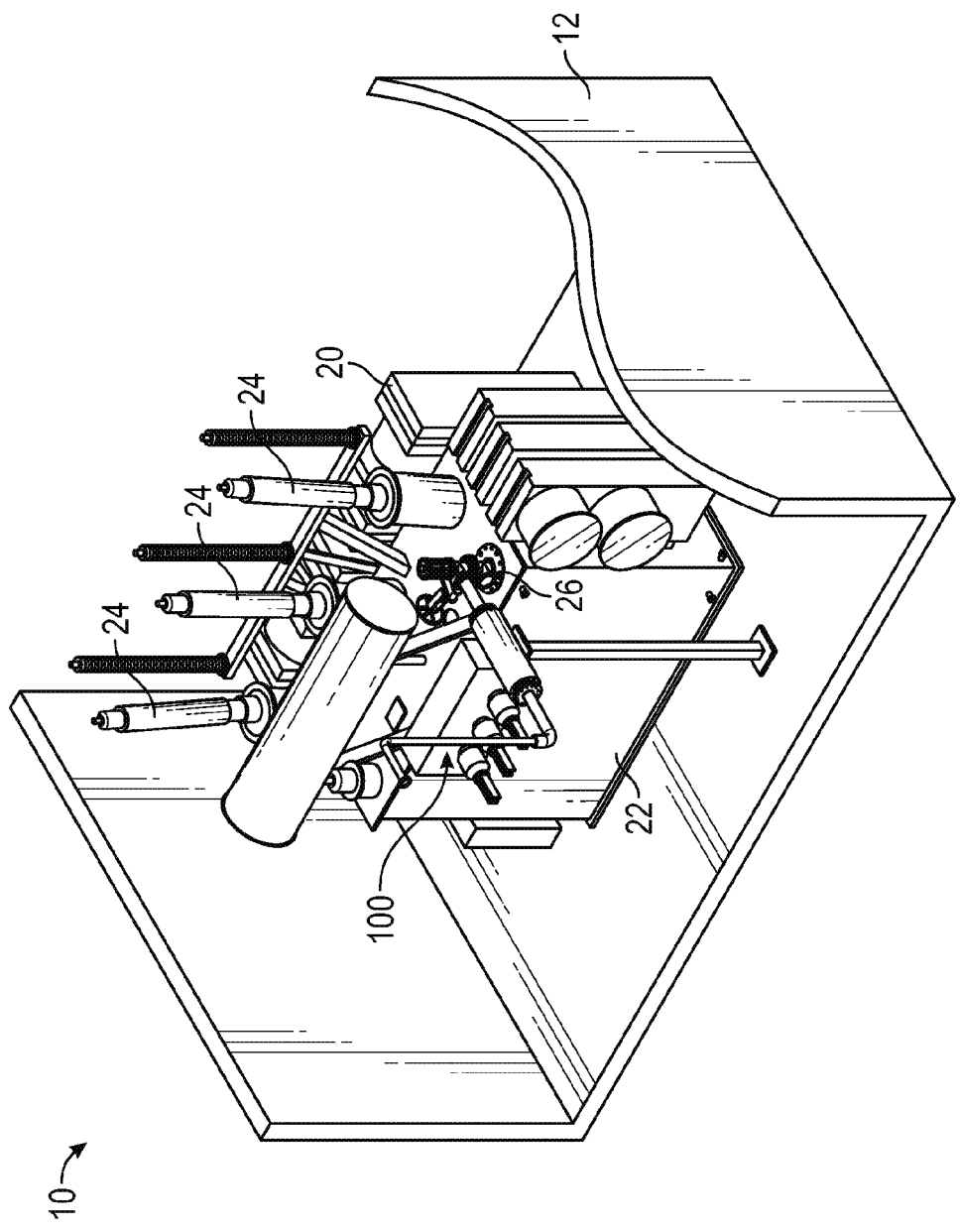
FIGS. 1A-1C are schematic representations of an electrical transformer assembly in accordance with the teachings herein.

In the drawings and description that follow, like parts are typically marked throughout the specification and drawings with the same reference numerals. The drawing figures are not necessarily to scale. Certain features of the invention may be shown exaggerated in scale or in somewhat schematic form and some details of conventional elements may not be shown in the interest of clarity and conciseness. The present disclosure is susceptible to embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed below may be employed separately or in any suitable combination to produce desired results.

Unless otherwise specified, in the following discussion and in the claims, the terms "including" and "comprising" are used in an open-ended fashion, and thus should be interpreted to mean "including, but not limited to . . . ". Any use of any form of the terms "connect", "engage", "couple", "attach", or any other term describing an interaction between elements is not meant to limit the interaction to direct interaction between the elements and may also include indirect interaction between the elements described. The term "fluid" may refer to a liquid or gas and is not solely related to any particular type of fluid such as hydrocarbons. The terms "pipe", "conduit", "line" or the like refers to any fluid transmission means. The various characteristics mentioned above, as well as other features and characteristics described in more detail below, will be readily apparent to those skilled in the art upon reading the following detailed description of the embodiments, and by referring to the accompanying drawings.

The embodiments described herein include a depressurization system configured for use with an electrical transformer. Herein is presented various combinations of components and principles which provide for the ability to rapidly relieve fluid pressure within a fluid filled chamber of an electrical transformer, so as to reduce the risk of overpressurizing the chamber. Particularly, embodiments of the depressurization system include a rupture pin valve configured to open at a predetermined fluid pressure. More particularly, embodiments of the depressurization system include a rupture pin valve and a blast chamber, where the blast chamber is configured to allow for rapid expansion of fluid relieved from the sealed chamber in the event of an overpressurization of the chamber.

Figure 1B:
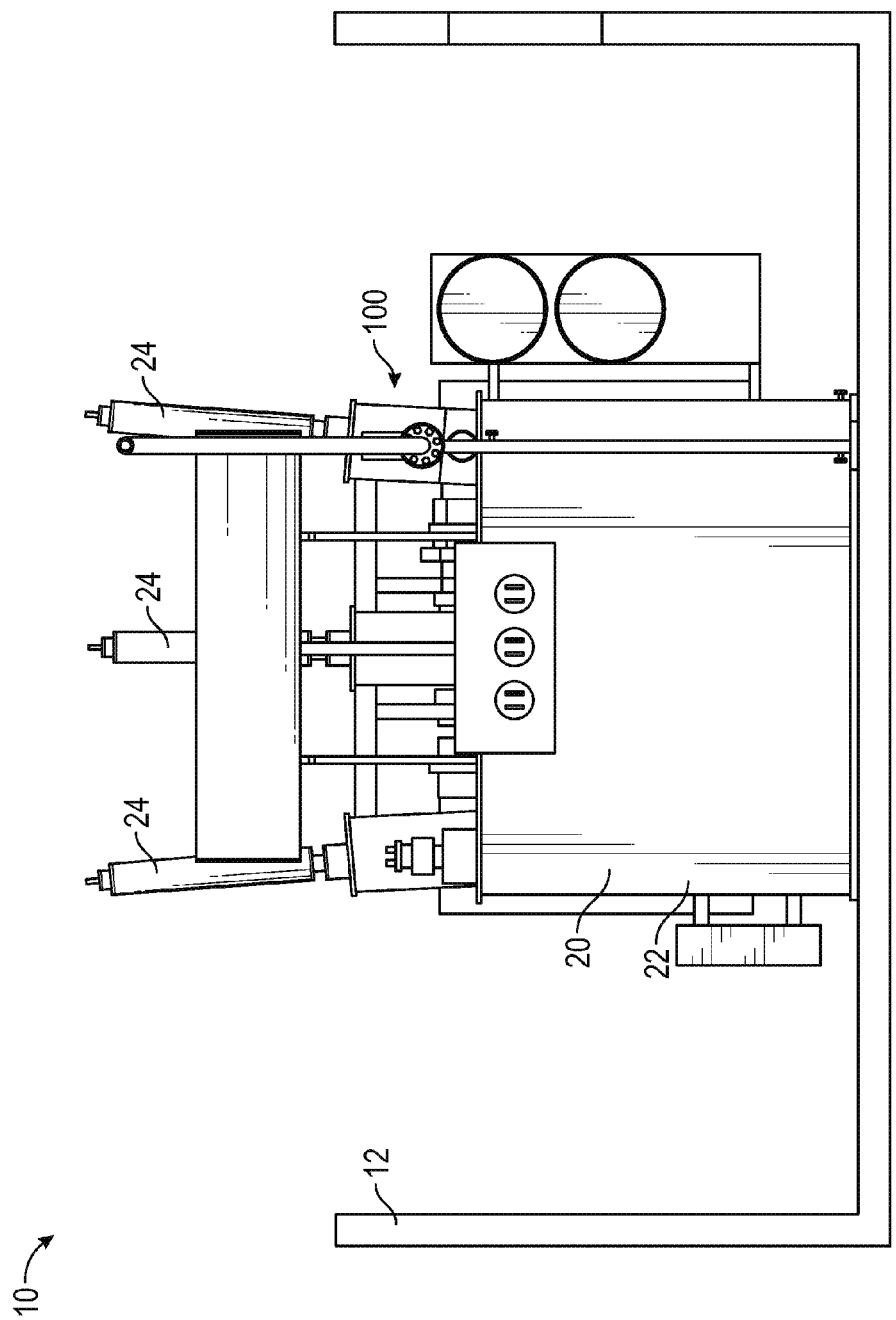
Figure 1C:
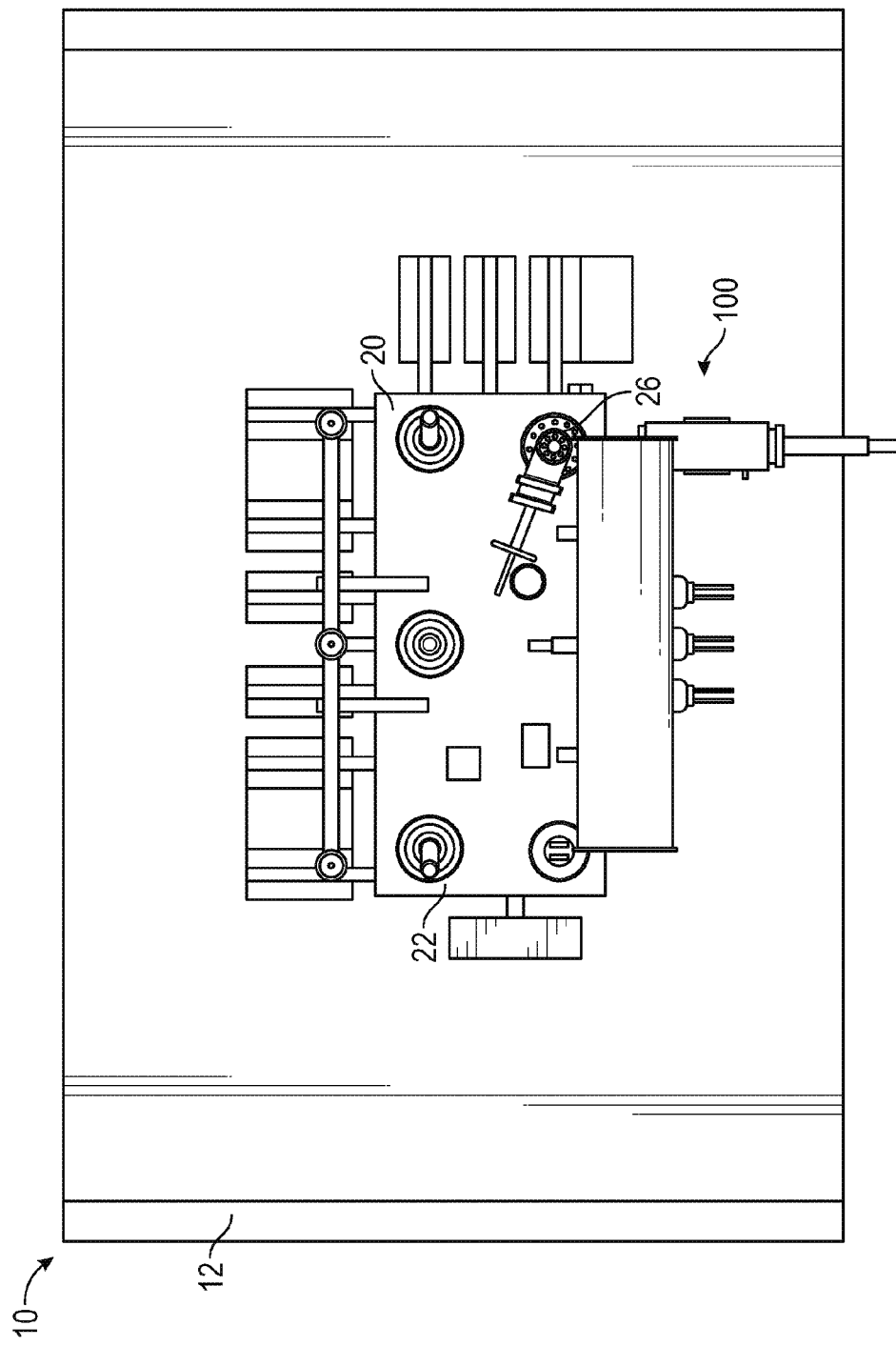

Referring initially to FIGS. 1A-1C, an electrical transformer system 10 is shown that includes an enclosure 12 that houses an electrical transformer 20 having an embodiment of a depressurization system (DS) 100 coupled thereto. The transformer 20 includes a sealed chamber 22, electrical cables 24 and DS 100. Sealed chamber 22 includes a magnetic core and electrical conductors disposed in a coolant. In the embodiment of transformer 20, the coolant contained within chamber 22 is mineral oil. However, in other embodiments chamber 22 may include other forms of coolant.

During operation, a high amount of alternating current flows through electrical cables 24 to the conductors housed within chamber 22, generating and transferring heat to the coolant disposed therein. Sealed chamber 22 also includes a manhole 26, which includes an opening that is configured to provide fluid communication between chamber 22 and DS 100. Thus, fluid pressure contained within chamber 22 may be communicated to DS 100 via manhole 26. During the operation of transformer 20, an ignition source, such as a spark, may take place within chamber 22, which may result in the combustion of at least a portion of the coolant within chamber 22, rapidly elevating the fluid pressure within chamber 22 and communicated to DS 100.

Figure 2A:
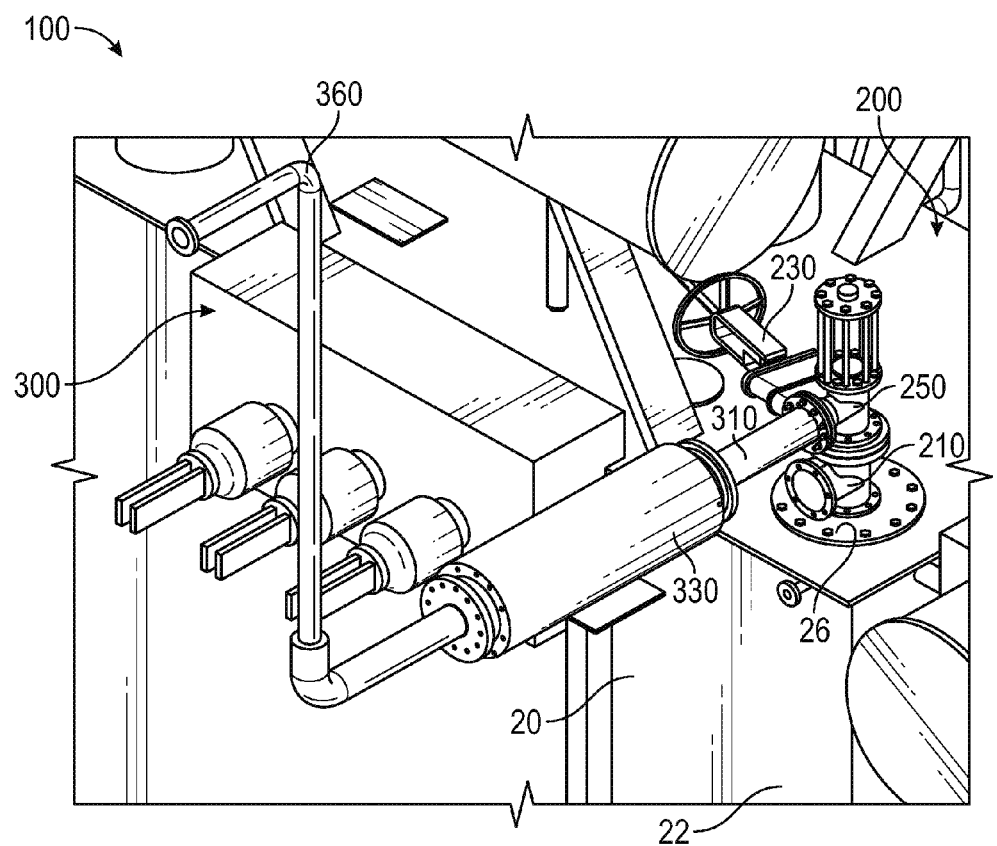
FIG. 2A is a perspective view of depressurization system in accordance with the teachings herein.
Figure 2B:
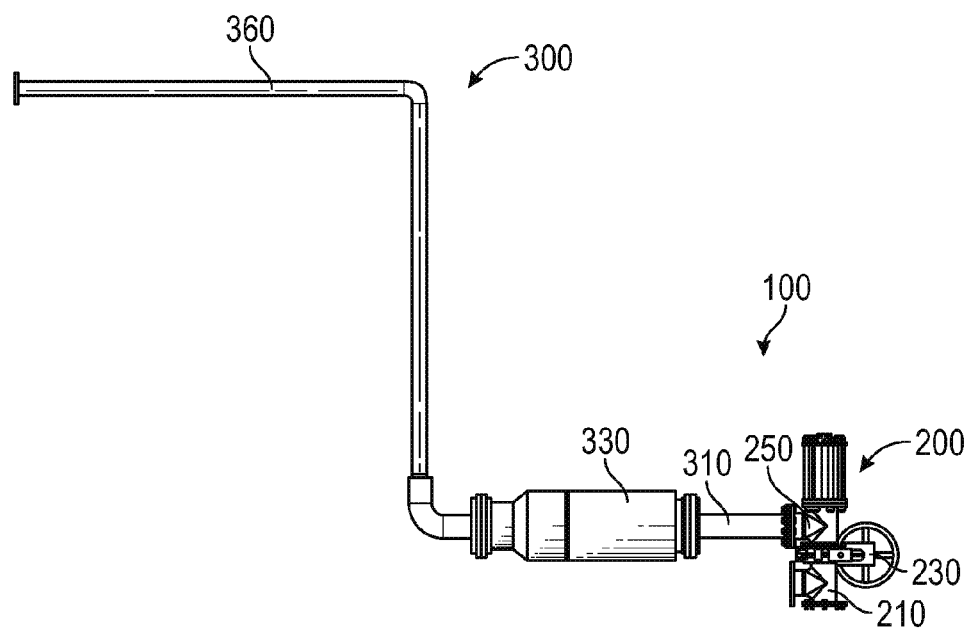
FIG. 2B is a side view of the depressurization system of FIG. 2A.

Referring now to FIGS. 2A and 2B, in this embodiment DS 100 includes a pressure release assembly 200 coupled to an evacuation assembly 300, as will be discussed in greater detail herein. The pressure release assembly 200 generally includes a T-riser 210, a knife valve 230 and a rupture pin valve 250. The pressure release assembly 200 is configured to provide selective fluid communication between the evacuation assembly 300 and the sealed chamber 22 of transformer 20. Specifically, pressure release assembly 200 is configured to provide fluid communication between chamber 20 and evacuation assembly 300 in the event of a fluid pressurization within chamber 20, such as a fluid pressurization due to combustion of coolant disposed within chamber 22. The evacuation assembly 300 generally includes an extension conduit 310, a blast chamber 330 and a fluid evacuation pipe 360. Evacuation assembly 300 is configured to rapidly reduce the pressure of fluid exiting from pressure release assembly 200 in the event of a fluid pressurization within sealed chamber 20.

Figure 3:
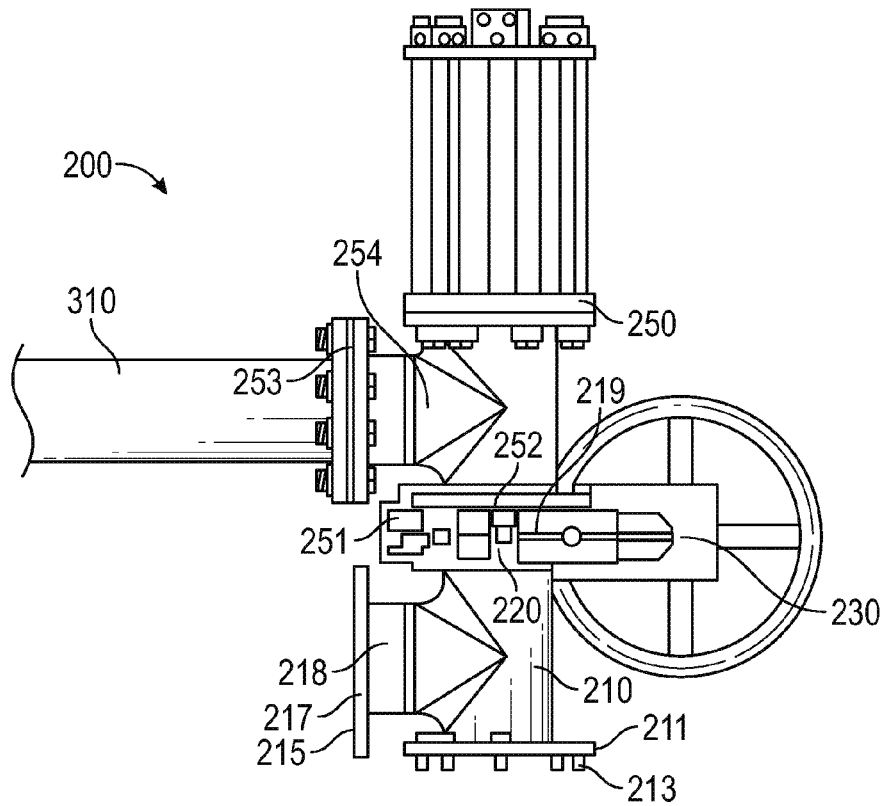
FIG. 3 is a schematic representation of a pressure relief assembly in accordance with the teachings herein.

Referring now to FIG. 3, the T-riser 210 of pressure release assembly 200 has a first end 211, a second end 215 and a third end 219. A flange is disposed at first end 211 and is configured to couple to manhole 26 of sealed chamber 22 (FIGS. 2A and 2B) via bolts 213. T-riser 210 also includes an opening 218 at second end 215. In the embodiment of assembly 200, a blind 217 couples to a flange at end 215, preventing fluid communication between T-riser 210 and the surrounding environment. However, in other embodiments, a PRV or other device may couple to the flange, and thus be in fluid communication with T-riser 210. Another opening 220 is disposed at third end 219, providing for fluid communication between T-riser 210 and knife valve 230, which couples to T-riser 210 at a flange disposed at third end 219. Also attached to valve 230 is the rupture pin valve 250, which couples to valve 230 via a flange disposed at a first end 251 of the rupture pin valve 250. Valve 250 also includes a first opening 252 at first end 251 and a second opening 254 at a second end 253. Opening 254 provides for fluid communication between rupture pin valve 250 and extension 310 via a flange disposed at second end 253.

Figure 4:
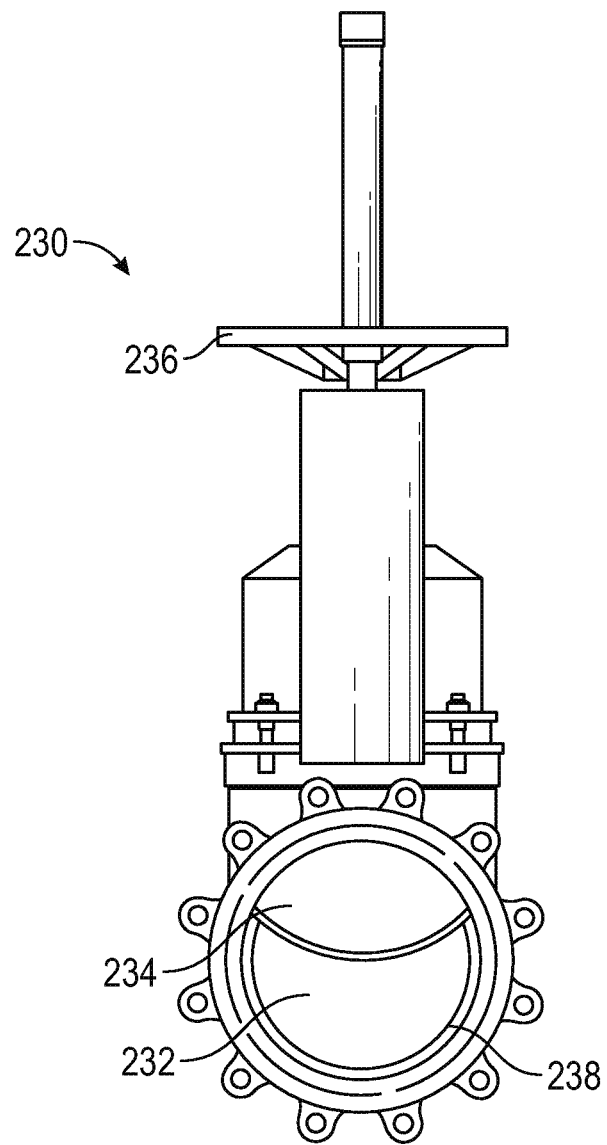
FIG. 4 is a schematic representation of a knife valve in accordance with the teachings herein.

Referring now to FIG. 4, knife valve 230 includes a central bore 232 and gate 234, which provide for selective fluid communication between T-riser 210 and rupture pin valve 250 (FIG. 3). Specifically, gate 234 may be actuated via turning a handle 236 in order to transition knife valve 230 between an open position (as shown in FIG. 4) and a closed position where gate 234 is landed against a valve seat 238, creating a fluidic seal where fluid flow is at least substantially restricted across valve 230. Under normal operation of transformer system 10 (FIGS. 1A-1C), knife valve 230 is in an open position. However, following a fluid pressurization within chamber 22 of transformer 20 and the actuation of rupture pin valve 250 (i.e., fluid pressure within chamber 22 has now been successfully relieved), knife valve 230 may be closed in order to fluidically isolate chamber 22 from the surrounding environment while rupture pin valve 250 is reset into a closed position.

Figure 5A:
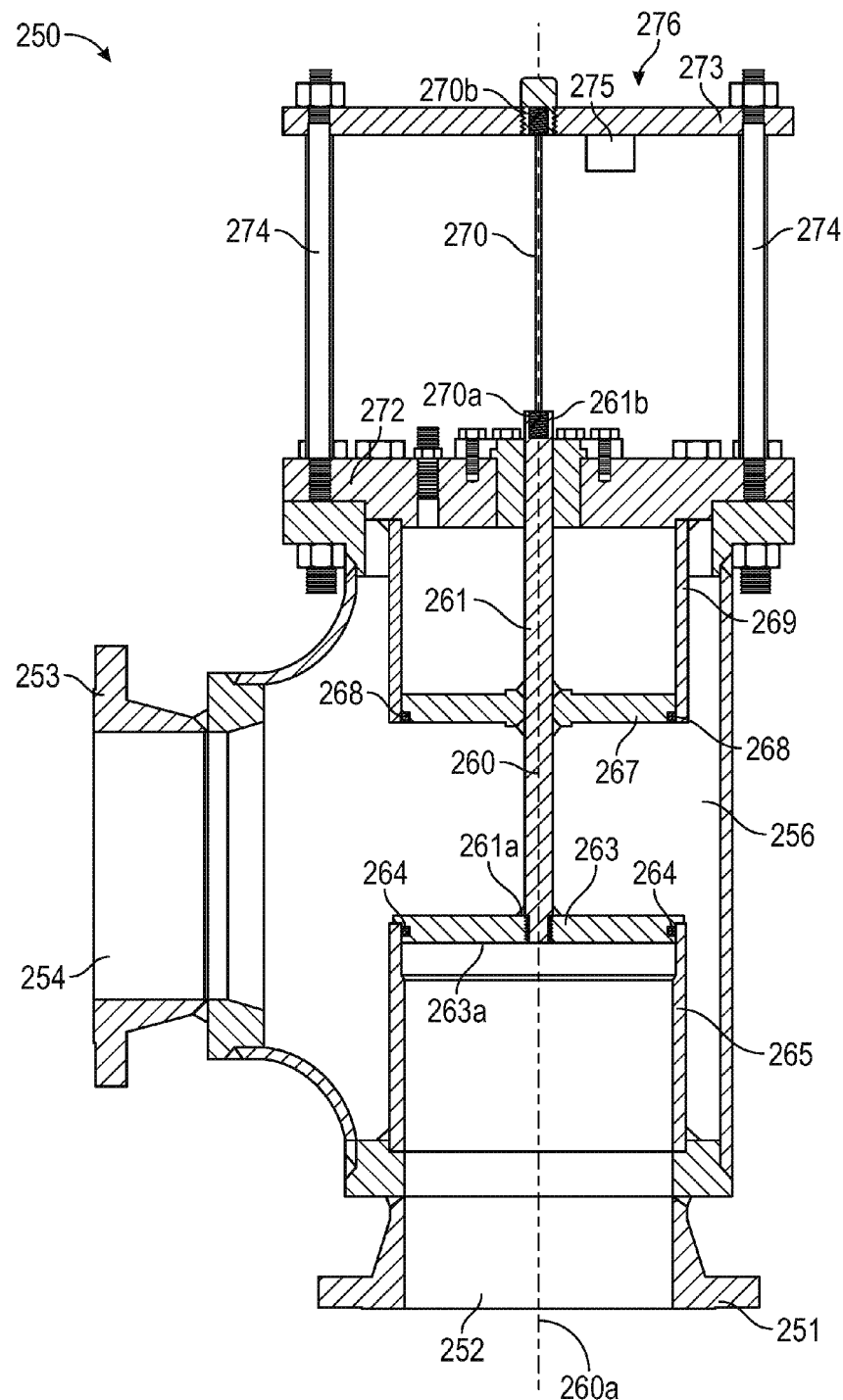
FIGS. 5A and 5B are cross-sectional views of a rupture pin valve in accordance with the teachings herein.
Figure 5B:
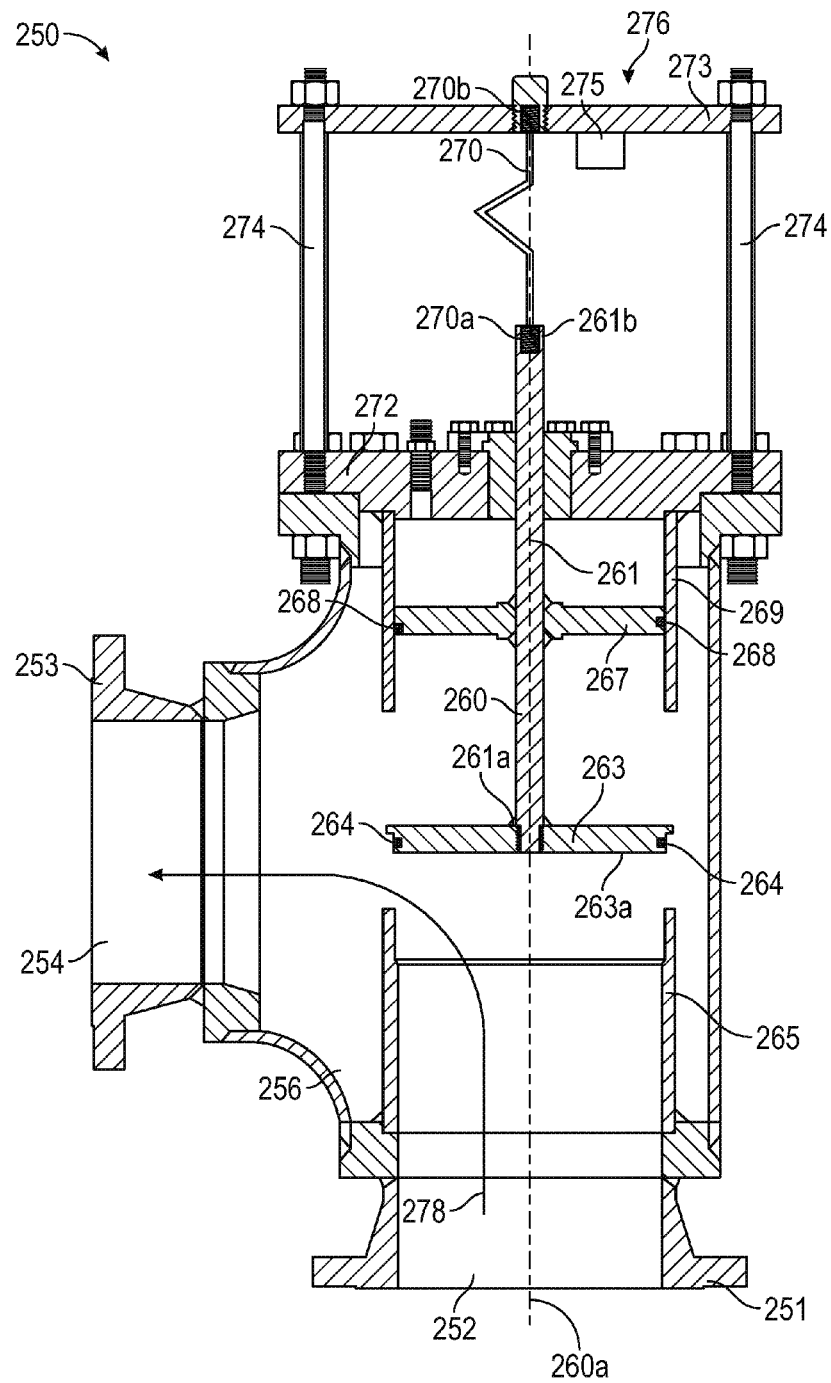

Referring now to FIGS. 5A and 5B, FIG. 5A illustrates rupture pin valve 250 in a closed position prior to actuation while FIG. 5B illustrates rupture pin valve 250 in an open position following actuation due to a fluid pressurization within chamber 22 of transformer 20 (FIGS. 1A-1C).

Rupture pin valve 250 includes openings 252, 254, and a central chamber 256 that is in fluid communication with opening 254 and selective fluid communication with opening 252. Valve 250 also includes a sealing assembly 260 having a central axis 260a for providing a fluid seal between openings 252 and 254 when valve 250 is in the closed position, as shown in FIG. 5A. Sealing assembly 260 includes a rod 261 having a first end 261a and a second end 261b, a lower flange 263 having a lower face 263a disposed at first end 261a of rod 261, an upper flange 267 disposed at some point along the axial length of rod 261, and a pin 270 disposed at second end 261b of rod 261. Lower flange 263 is configured to physically engage a cylinder 265 that extends upward from first end 251. Seal 264, disposed about the outer surface of lower flange 263, sealingly engages an inner surface of cylinder 264 to fluidically isolate chamber 256 from opening 252 when rupture pin valve 250 is in the closed position.

Upper flange 267 is configured to physically engage a cylinder 269 that extends downward from a lower plate 272. Seal 268, disposed about the outer surface of upper flange 267, sealingly engages an inner surface of cylinder 269 to fluidically isolate chamber 256 from the surrounding environment. Pin 270 has a first end 270a coupled to rod 261 at its second end 261b, and a second end 270b coupled to an upper plate 273. Upper plate 273 is rigidly coupled to lower plate 272 via a plurality of bolts 274, thus preventing or at least substantially restricting relative axial movement between plates 272 and 273 (i.e., relative movement with respect to axis 260a).

Thus, as configured, sealing assembly 260 is configured to translate along axis 260a. However, such axial movement by assembly 260 is forcibly restricted by pin 270. For instance, fluid pressure within opening 252 transmits an axial force to assembly 260 via lower face 263a of lower flange 263. A corresponding axial force in the opposite direction is applied to assembly 260 by pin 270, as pin 270 is rigidly supported by upper plate 273. Because of the pressure force applied to lower face 263a, and the rigid support of upper plate 273, equal and opposite axial compressive forces are applied to lower end 270a and upper end 270b of pin 270, which resolve into a buckling force on pin 270.

Pin 270 is configured to resist this buckling force applied at each end up until a certain predetermined point, which corresponds to a predetermined fluid pressure within opening 252. Once this predetermined fluid pressure is reached, the buckling force applied to pin 270 reaches a critical level where pin 270 then buckles, allowing for axial movement of sealing assembly 260 upward towards upper plate 273 (as shown in FIG. 5B). Once pin 270 has buckled and sealing assembly 260 has been axially displaced, a fluid flowpath 278 is established between opening 252, chamber 256 and opening 254.

In the embodiment of rupture pin valve 250, valve 250 includes a motion or proximity sensor 275 disposed adjacent to pin 270. Sensor 275 is configured to detect motion by pin 270, and thus may detect the buckling of pin 270 as rupture pin valve 250 is actuated by fluid pressure within opening 252. Sensor 275 is coupled to an alarm system 276 that is actuated by the transmission of a signal from sensor 275. The alarm system 276 automatically electrically shuts off transformer 20 (FIGS. 1A-1C) and alerts an operator or other personnel in charge of the transformer system 10 that rupture pin valve 250 has been actuated and thus there may have been a fluid pressurization of chamber 22 of transformer 20. In this event, the operator may then seal chamber 22 from the surrounding environment by manually closing knife valve 230. A new and undamaged pin 270 may then be installed in rupture pin valve 250, allowing the operator to reopen knife valve 230 and return the transformer 20 to service. In this fashion, depressurization system 100 may be brought back into service without disassembling any of its components (e.g., uncoupling assembly 300 from assembly 200, etc.). Rupture pin valves suitable for use in relief assembly 200 include those from Buckling Pin Technology in Tampa, Fla.

There exists a period of time between a fluid pressurization of chamber 22 and the opening of rupture pin valve 250 via the buckling of pin 270, referred to as a response time, as discussed earlier. However, in the embodiment of rupture pin valve 250, the response time of valve 250 is between 1-3 milliseconds (ms), versus up to one second for PRVs or burst discs. Thus, valve 250 allows for the relief of fluid pressure within chamber 22 at a more rapid speed than with a traditional PRV system. The relatively quicker response time of rupture pin valve 250 may reduce the likelihood of a fluid overpressurization within chamber 22 in the event of rapid fluid pressurization within it due to ignition of fluid within the chamber 22.

Figure 6:
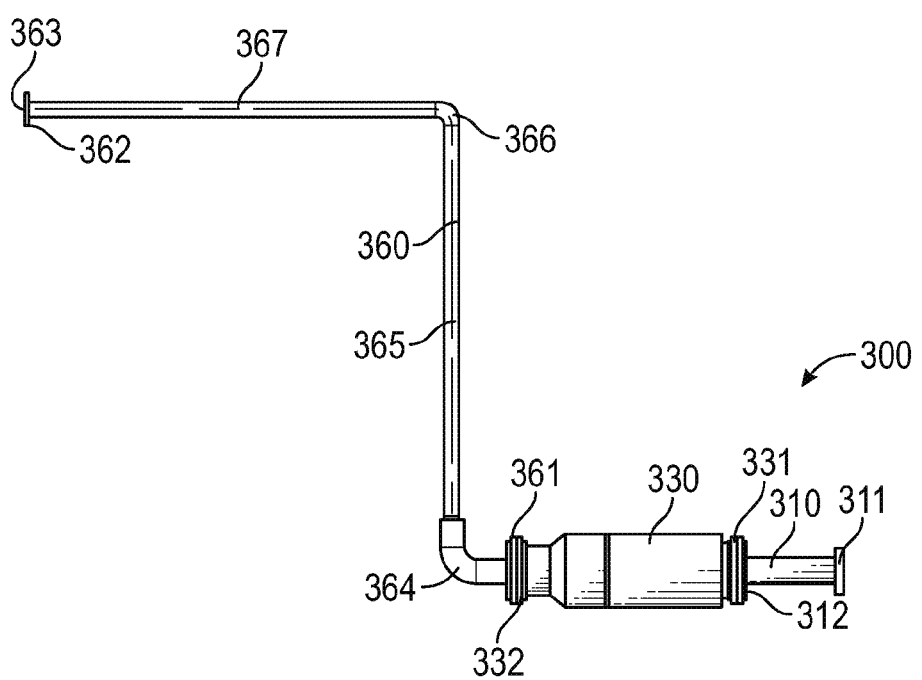
FIG. 6 is a schematic representation of an evacuation assembly in accordance with the teachings herein.

Referring now to FIG. 6, extension 310 of evacuation assembly 300 is configured to provide axial distance between rupture pin valve 250 and blast chamber 330 and has a first end 311 that couples to second end 253 of rupture pin valve 250 and puts extension 310 into fluid communication with opening 254 of valve 250. A second end 312 of extension 310 couples to the blast chamber 330 at a first end 331 of chamber 330.

Figure 7A:
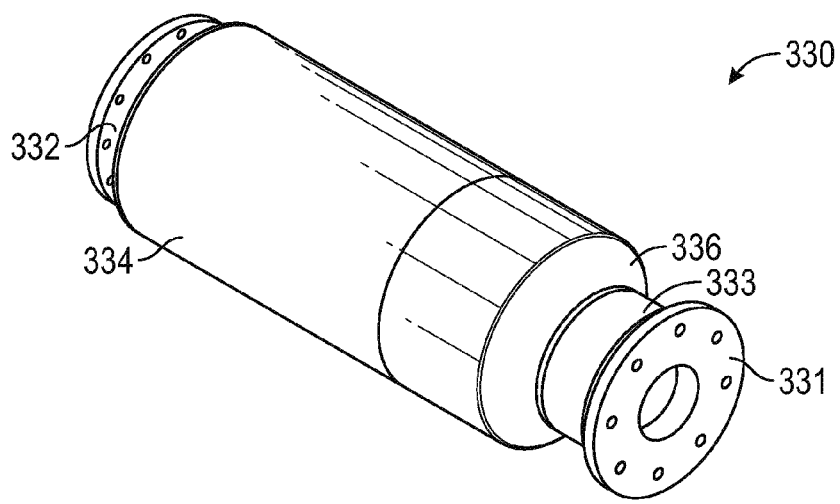
FIG. 7A is a perspective view of a blast chamber in accordance with the teachings herein.
Figure 7B:
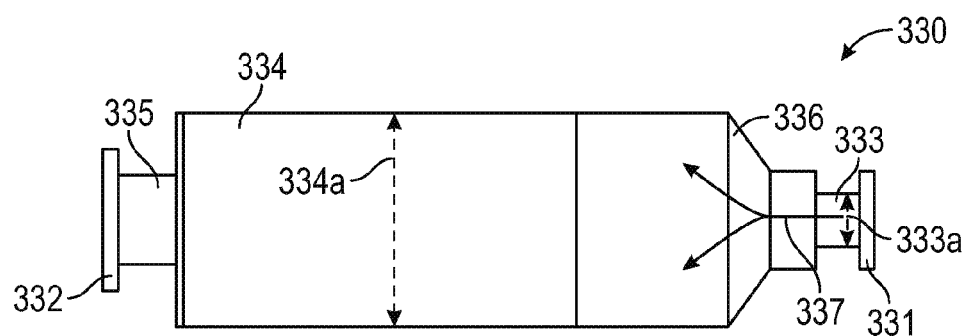
FIG. 7B is a side view of the blast chamber of FIG. 3A.

Referring now to FIGS. 6, 7A and 7B, blast chamber 330 has first end 331 and a second end 332 and is configured to provide or allow for radial expansion of fluids entering from extension 310 so as to reduce the amount of fluid pressure within chamber 330. Reducing fluid pressure within chamber 330 via radial expansion allows less of a restriction on the flow of fluid out of chamber 22 of transformer 20 (FIGS. 1A-1C), allowing for more rapid evacuation of fluid out of chamber 22. Blast chamber 330 includes an inlet section 333, a main chamber 334, an outlet section 335, and transitional section 336. Inlet 333 has an internal diameter 333a while main chamber 334 has an internal diameter 334a. Diameter 334a of main chamber 334 is substantially greater than the diameter 333a of inlet 333, allowing for the expansion of fluid along flowpath 337 as it flows from inlet 333, through transition section 336 and into main chamber 334. In order to reduce any restrictions within system 100, blast chamber 330 is positioned proximal or in close proximity to pressure release assembly 200. Extension conduit 310 is configured to be just long enough to allow for clearance of the larger diameter main chamber 334 of blast chamber 333, thus minimizing the length of the fluid flowpath from chamber 22 of transformer 20 to blast chamber 330. Blast chamber 330, and extension conduit 310, may be in horizontally disposed or substantially perpendicular to the axis 260a of the pin valve 250.

Evacuation pipe 360 has a first end 361 and a second end 362 and is configured to increase the distance between transformer 20 and any fluid ejected to the atmosphere in the event of a fluid pressurization of chamber 22 of transformer 20. Blast chamber 330 couples to the first end 361 of pipe 360 at chamber 330's second end 332. Pipe 360 is configured to emit fluid from chamber 22 of transformer 20 to the surrounding environment via an opening 363 at the second end 362 at a relatively safe distance from transformer 20, so as to minimize the risk of the fluid from igniting or otherwise causing further damage once it has exited to the ambient environment. Pipe 360 includes a first elbow 364, a vertical section 365, a second elbow 366 and a horizontal section 367. Both vertical section 365 and horizontal section 367 span relatively long distances, as compared with the axial distance of blast chamber 330, and thus opening 363 at second end 362 is at a relatively safe distance from transformer 20.

Figure 8:
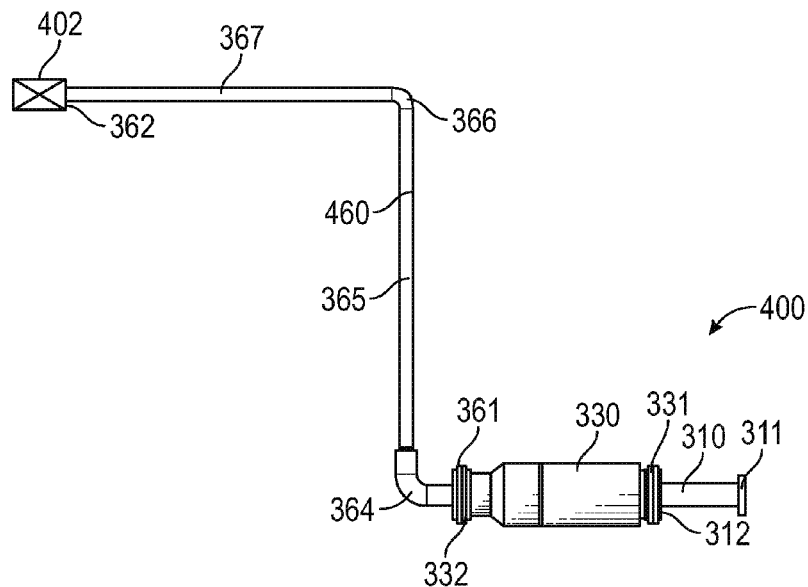
FIG. 8 is another embodiment of an evacuation assembly in accordance with the teachings herein.

Referring now to FIG. 8, in an alternative embodiment, an evacuation assembly 400 includes an evacuation pipe 460, similar to pipe 360 (reference numerals numbered similarly), with a check valve 402 disposed at second end 362. Check valve 402 is configured to allow for the flow of fluid out of pipe 460 to the surrounding ambient environment, but to prevent or at least substantially restrict fluid flow from the surrounding environment into pipe 460 at second end 362.

Figure 9:
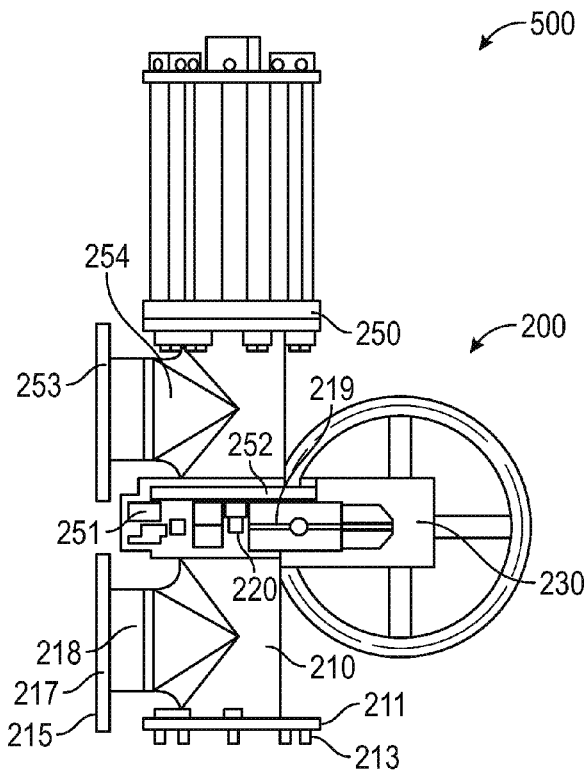
FIG. 9 is another embodiment of a depressurization system in accordance with the teachings herein.

Referring now to FIG. 9, another embodiment of a depressurization system 500 for use with an electrical transformer (e.g., transformer 20) includes the pressure release assembly 200 of depressurization system 100. However, in this embodiment, in the event of a pressurization within a sealed chamber of the transformer, instead of flowing the high pressure fluid into evacuation assembly 300 from assembly 200, in the embodiment of system 500 the high pressure fluid is ejected directly into the surrounding atmosphere via the opening 254 at second end 253 of rupture pin valve 250. In some applications, it may be advantageous to dump directly to atmosphere at opening 254, for instance, due to space constrains at the electrical transformer.

Figure 10:
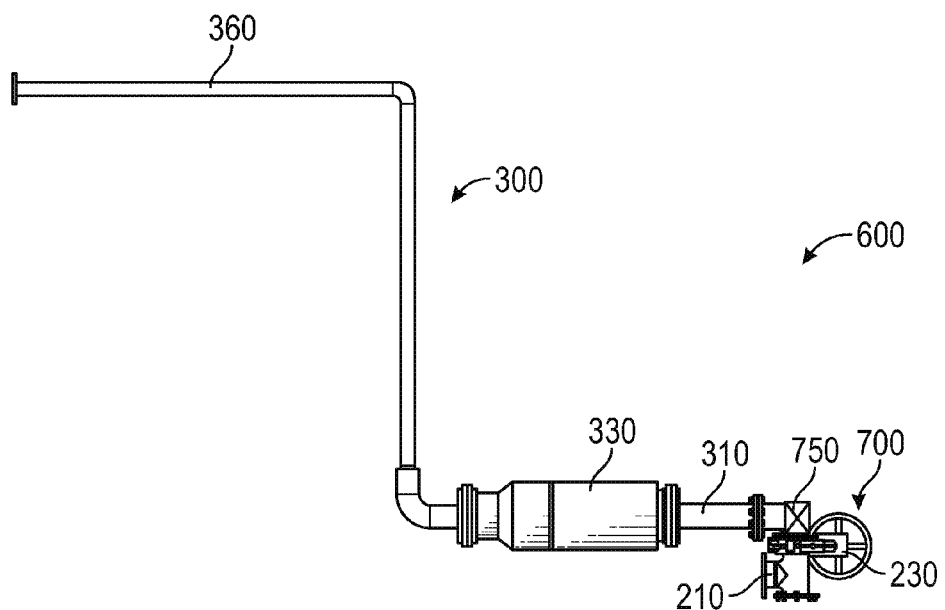
FIG. 10 is another embodiment of a depressurization system in accordance with the teachings herein.

Referring now to FIG. 10, in this embodiment depressurization system 600 includes a pressure release assembly 700 and the evacuation assembly 300. Assembly 700 includes the T-riser 210 and knife valve 230 of pressure release assembly 200, but instead of rupture pin valve 250, assembly 700 includes a pressure release mechanism 750. In this embodiment, mechanism 750 is a PRV that allows for selective fluid communication between T-riser 210 and assembly 300 via compressing a spring within mechanism 750 which opens up a fluid flowpath through the mechanism 750. The spring within mechanism 750 is compressed by exposing a surface of mechanism 750 to a particular amount of fluid pressure (i.e., the spring within mechanism 750 is configured to compress in response to a certain amount of pressure). While the embodiment of assembly 700 includes mechanism 750, in other embodiments a pressure release assembly may include a burst disc that is configured to burst or rupture when exposed to a predetermined amount of differential pressure.

The above discussion is meant to be illustrative of the principles and various embodiments of the present disclosure. While certain embodiments have been shown and described, modifications thereof can be made by one skilled in the art without departing from the spirit and teachings of the disclosure. The embodiments described herein are exemplary only, and are not limiting. Accordingly, the scope of protection is not limited by the description set out above, but is only limited by the claims which follow, that scope including all equivalents of the subject matter of the claims.

What is claimed is:

1. A depressurization system for an electrical transformer comprising:
   a pressure release assembly configured to be in fluid communication with a chamber of an electrical transformer;
   a horizontally extending blast chamber coupled to the pressure release assembly and in selective fluid communication with the chamber, wherein the blast chamber is configured to reduce a flow restriction within the depressurization system as fluid flows through the blast chamber; and
   an evacuation pipe in fluid communication with the blast chamber, wherein the evacuation pipe is configured to eject fluid flowing through the evacuation pipe to the surrounding atmosphere in response to an overpressurization of the chamber of the electrical transformer;
   wherein the pressure release assembly comprises a rupture pin valve comprising a rupture pin valve body coupled to the blast chamber, wherein the rupture pin valve body is configured to provide a rupture pin chamber sealed from the blast chamber to access a rupture pin of the rupture pin valve.

2. The system of claim 1, wherein the blast chamber is coupled in close proximity to the rupture pin valve via an extension conduit.

3. The system of claim 1, wherein the rupture pin is configured to buckle in response to a predetermined pressure applied to a surface of the rupture pin valve.

4. The system of claim 3, further comprising a proximity sensor coupled to the rupture pin valve, wherein the proximity sensor is configured to transmit a signal in response to buckling of the pin.

5. The system of claim 1, wherein the blast chamber comprises:
- a first end configured to receive fluid flow from the pressure release assembly; and
- a second end configured to provide fluid flow to the evacuation pipe;
- wherein the first and second ends of the blast chamber are disposed along a longitudinal axis of the blast chamber.

6. The system of claim 5, wherein the blast chamber comprises:
- an inlet section having a first internal diameter;
- a main chamber having a second internal diameter that is greater than the first internal diameter; and
- a frustoconical transition section disposed between the inlet section and the main chamber.

7. The system of claim 1, wherein the evacuation pipe comprises a check valve disposed at a terminal end of the evacuation pipe, wherein the check valve is configured to restrict fluid flow into the depressurization system from the surrounding atmosphere.

8. The system of claim 1, further comprising a knife valve coupled between the pressure release assembly and the chamber of the electrical transformer, wherein the knife valve includes an open position providing fluid communication between the chamber of the electrical transformer and the pressure release assembly and a closed position sealing the chamber from the pressure release assembly.

9. The system of claim 1, wherein the blast chamber is configured to provide for radial expansion of received fluids.

10. A depressurization system for an electrical transformer comprising:
- a pressure release assembly configured to be in fluid communication with a chamber of an electrical transformer;
- a blast chamber coupled to the pressure release assembly and in selective fluid communication with the chamber, wherein the blast chamber is configured to reduce a flow restriction within the depressurization system as fluid flows through the blast chamber; and
- an evacuation pipe coupled to the blast chamber and comprising a check valve disposed at a terminal end of the evacuation pipe, wherein the check valve is configured to restrict fluid flow into the depressurization system from the surrounding atmosphere;
- wherein the pressure release assembly comprises a rupture pin valve comprising a rupture pin valve body coupled to the blast chamber, wherein the rupture pin valve body is configured to provide a rupture pin chamber sealed from the blast chamber to access a rupture pin of the rupture pin valve.

11. The system of claim 10, wherein the evacuation pipe comprises a horizontal section configured to increase the distance between the electrical transformer and fluid ejected to the surrounding atmosphere in response to an overpressurization of the chamber of the electrical transformer.

12. The system of claim 10, wherein the rupture pin valve comprises a pressure relief valve of the electrical transformer.

13. The system of claim 10, wherein the evacuation pipe is configured to eject fluid flowing through the evacuation pipe to the surrounding atmosphere in response to an overpressurization of the chamber of the electrical transformer.

14. The system of claim 10, further comprising a knife valve coupled between the pressure release assembly and the chamber of the electrical transformer, wherein the knife valve includes an open position providing fluid communication between the chamber of the electrical transformer and the pressure release assembly and a closed position sealing the chamber from the pressure release assembly.

15. The system of claim 10, wherein the blast chamber comprises:
- a first end configured to receive fluid flow from the pressure release assembly; and
- a second end configured to provide fluid flow to the evacuation pipe;
- wherein the first and second ends of the blast chamber are disposed along a longitudinal axis of the blast camber.

16. A depressurization system for an electrical transformer comprising:
- a pressure release assembly configured to be in fluid communication with a chamber of an electrical transformer;
- a blast chamber coupled to the pressure release assembly and in selective fluid communication with the chamber, wherein the blast chamber is configured to reduce a flow restriction within the depressurization system as fluid flows through the blast chamber;
- a knife valve coupled between the pressure release assembly and the chamber of the electrical transformer, wherein the knife valve includes an open position providing fluid communication between the chamber of the electrical transformer and the pressure release assembly and a closed position sealing the chamber from the pressure release assembly; and
- an evacuation pipe in fluid communication with the blast chamber, wherein the evacuation pipe is configured to eject fluid flowing through the evacuation pipe to the surrounding atmosphere in response to an overpressurization of the chamber of the electrical transformer;
- wherein the pressure release assembly comprises a rupture pin valve comprising a rupture pin valve body coupled to the blast chamber, wherein the rupture pin valve body is configured to provide a rupture pin chamber sealed from the blast chamber to access a rupture pin of the rupture pin valve.

17. The system of claim 16, wherein the knife valve comprises a handle configured to actuate the knife valve between the open and closed positions.

18. The system of claim 16, wherein the blast chamber extends horizontally between a first end and a second end.

19. The system of claim 16, wherein the evacuation pipe comprises a check valve disposed at a terminal end of the evacuation pipe, wherein the check valve is configured to restrict fluid flow into the depressurization system from the surrounding atmosphere.

* * * * *